June 26, 1928.  1,674,790
H. A. OTTO
SEPARATOR AND METHOD OF SEPARATING EXTRANEOUS MATERIAL FROM FLUIDS
Filed Nov. 5, 1924  4 Sheets-Sheet 1

Patented June 26, 1928.

1,674,790

UNITED STATES PATENT OFFICE.

HARRY A. OTTO, OF PITTSBURGH, PENNSYLVANIA, ASSIGNOR TO JOHN M. HOPWOOD, OF DORMONT, PENNSYLVANIA.

SEPARATOR AND METHOD OF SEPARATING EXTRANEOUS MATERIAL FROM FLUIDS.

Application filed November 5, 1924. Serial No. 747,965.

This invention relates to separators such as are employed in separating extraneous material from fluids or gases.

An object of the invention is to produce a separator, capable of removing extraneous material from a stream of fluid moving at a relatively high velocity, which is simpler in construction and simpler and more effective in operation than separators heretofore employed and known to me.

A further and more specific object of the invention is to produce a separator having the structural and functional characteristics above specified, which is particularly adapted to separate moisture or water from steam, so that the steam delivered will have approximately the theoretical characteristics of what is known as "dry and saturated" steam.

A further object of the invention is to produce a new and improved method of extracting extraneous material from a stream of gaseous fluid moving at a relatively high velocity which accomplishes a higher percentage of separation than methods now in use and known to me.

These and other objects which will be made more apparent throughout the further description of my invention are attained by means of the method and apparatus herein described.

In the drawings accompanying and forming a part hereof:—

It has heretofore been possible to extract a portion of the extraneous material entrained by a stream of gaseous fluid but, even where conditions are such that the rate of flow of the fluid is relatively slow, it has been almost prohibitive, from the standpoint of first cost and operating cost, to provide an apparatus which will remove substantially all of the extraneous material from the fluid. It has also been possible to remove a portion of the water carried by a stream of steam moving at high velocity, but it has been impossible to produce a separator or a method of treating steam moving at a high and a variable velocity, which will extract substantially all of the extraneous moisture entrained by the steam and will deliver steam approximating characteristics of "dry and saturated" steam, when the steam originally contains a high percentage of moisture.

With my invention, it is possible to separate the extraneous moisture and other impurities from steam delivered from a boiler or generator, even when the generator is priming badly and to deliver approximately clean dry steam without the necessity of resorting to secondary heating or superheating devices.

In carrying out the method forming an embodiment of my invention, I subject the rapidly moving stream of fluid to be treated to a two stage separation treatment. In the first stage I occasion a whirling velocity in the stream of fluid to be treated, and provide means for extracting such portion of the extraneous material, such as water, as is thrown outwardly by centrifugal force. For the purpose of to some extent accentuating the effectiveness of the centrifugal action in removing extraneous water, I find that it is desirable to abruptly change the lineal direction of flow of the fluid stream while it is subjected to an intense whirling action.

I have also found that, while a large percentage of the extraneous material such as water carried by steam may be removed in this way by a single stage separator, a substantial amount of the moisture either remains in the moving stream or is re-entrained by it, and that complete or adequate separation cannot be obtained. For this reason, I have found that it is essential to employ a second stage for the purpose of extracting the extraneous material remaining in the stream after it has traversed the first stage.

In my preferred form of apparatus, which will hereinafter be more fully described in detail, I abruptly change the lineal direction of flow of the stream of steam or gaseous fluid while the stream is rotating or whirling at a high velocity. I then reduce the diameter of the whirling stream and at the same time, or substantially simultaneously with the reduction in diameter, subject the stream to the cohesive action of a collecting surface, such as a wetted surface.

Under such conditions, a relatively large portion of the fluid stream is subjected to the collecting action of the wetted or cohesive surface, due to the fact that the stream moving past the wetted surface retains its whirling motion and is also rendered less homogeneous, from the standpoint of stream line flow, in that uniform stream line flow has not been well established because of the disturbance occasioned by the abrupt reversal in direction of flow, the reduction in diameter of the stream, and the whirling velocity imparted to the stream.

The collecting surface is preferably a cylindrical surface which defines the sectional area and also the lineal direction of flow of the stream and which may be wetted by the liquid collected from the stream passing through it. Such a surface is particularly effective when employed under the conditions above described, since the whirling velocity of the stream tends to move the remaining extraneous material, such as liquid carried by the stream, outwardly by centrifugal force and into contact with the collecting surface, where it forms a uniform, thin film, which is a condition essential to prevent re-entrainment of the collected moisture.

If the moisture be allowed to accumulate on the collecting surface in the form of globules or in the form of a relatively thick film instead of a thin, uniform film, the entraining action of the rapidly moving stream passing the collecting surface will break the globules or a portion of the film into a fine spray which will be re-entrained by the stream and carried out of the separator. It is, therefore, necessary to maintain the film sufficiently thin so that the cohesive force acting on it will prevent re-entrainment by the rapidly moving stream of fluid.

It is, of course, apparent that this favorable condition will not exist if large amounts of moisture or liquid are thrown onto or collected by the wetted surface or even if small amounts of liquid accumulate on the collecting surface in the form of drops or globules. For this reason, I employ the primary stage, which removes the larger part of the moisture or liquid carried by the stream and, therefore, prevent the delivery of large quantities of moisture or liquid to the collecting surface; and I also employ a collecting surface composed of material which is readily wetted by the liquid to be extracted from the stream of fluid.

With this combination of elements, I ensure the production of a uniform, thin film of liquid on the collecting surface, since, as has been said, the greater portion of the liquid entrained by the fluid stream is removed in the first stage, and the high affinity of the collecting surface for the relatively small amount of liquid collected by the second stage ensures a uniform distribution of this liquid in the form of a thin film spread over the entire collecting surface.

While I realize that centrifugal force has heretofore been employed for the purpose of extracting extraneous water from steam and also for the purpose of extracting extraneous material from other gaseous fluids, while moving at a high velocity, and that the principle of subjecting gaseous fluids to a wetted surface has also been employed, I believe that I am the first to employ a two-stage separator embodying both principles, and so constructed and arranged that one stage contributes to the effectiveness of the other in such a way that the combined apparatus accomplishes a separation of approximately all of the extraneous material from a fluid while that fluid is moving at a high lineal velocity.

I have discovered that, while a wetted surface, employed under conditions such as are above described, is highly effective in initially collecting extraneous material, such as water, from a gaseous fluid, such as steam, some difficulty is encountered in removing the water or material from the surface and preventing at least an appreciable portion thereof being re-entrained by the rapidly moving stream.

One of the features of my invention, which will hereinafter be more fully described, is that I so form and locate the collecting surface, that the entraining action of the rapidly moving stream aids the collection of the water or extraneous material, adhering to the wetted surface, by moving it along the surface and to a point thereon where the entraining action of the stream is so minimized and offset by another force, that there is little or no tendency for globules of water or extraneous material to form and explode or break up into smaller drops or spray and be re-entrained by the stream.

Figure 1:
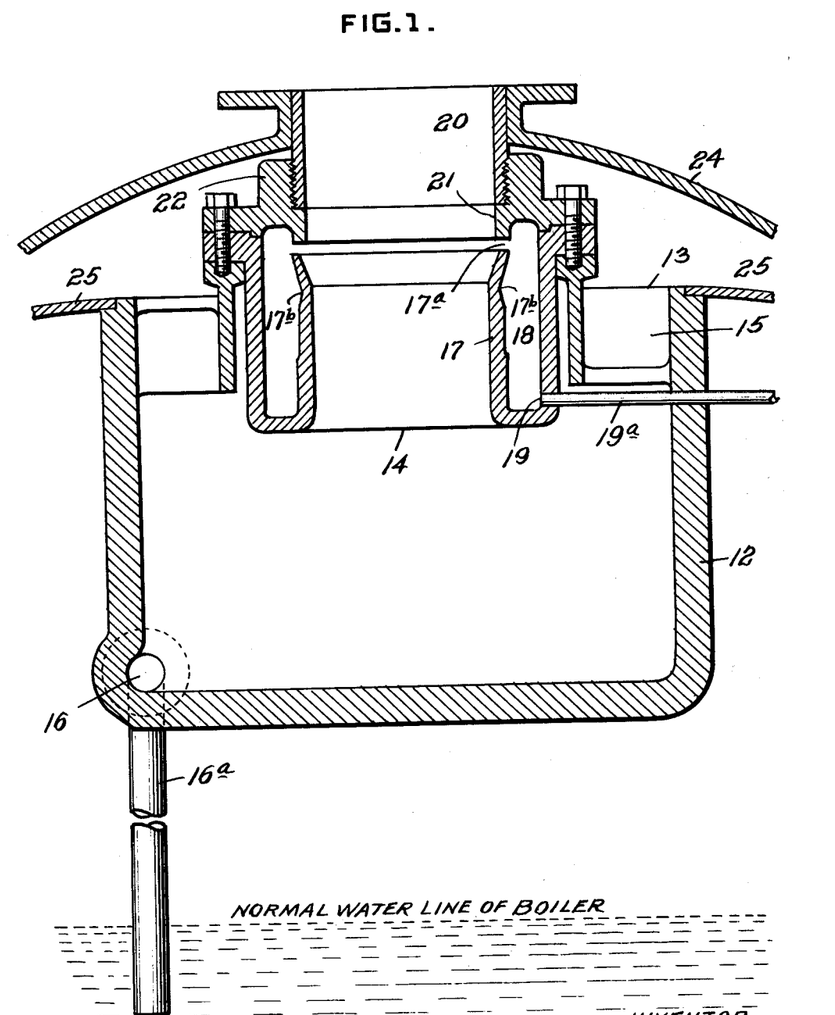
Figure 1 is a sectional view of apparatus embodying my invention, shown in connection with a fragmental sectional view of the shell of a vapor generator such as a still, evaporator or steam boiler.

As illustrated in Fig. 1 of the drawings, the apparatus embodying my invention and employed in carrying out my improved method includes a chamber 12 provided with a fluid inlet port 13 and a fluid outlet port 14. Means are associated with this chamber for occasioning a high whirling or rotary velocity of the fluid traversing the chamber, and the outlet port is preferably so located with relation to the inlet port that the lineal direction of flow of the fluid is abruptly changed, while the fluid is subjected to an intense whirling action.

As shown, the inlet port 13 is annular, surrounds the outlet port 14 and is provided with a series of inclined directing vanes 15 which impart a whirling or rotary velocity to the fluid entering the chamber 12. Both the fluid inlet and the fluid outlet ports are located in the top of the chamber 12 and the chamber is provided with a cylindrical side wall which is located adjacent to the outer peripheral edge of the annular inlet port. With such an arrangement of apparatus, steam or fluid, moving at a high velocity, enters the chamber around substantially the entire periphery of its cylindrical wall and the vanes 15 impart a high rotary or whirling velocity to it. This rotary velocity tends to and does throw extraneous material, such as water carried by the stream, outwardly in contact with the cylindrical wall of the chamber. The liquid so separated from the main body of the whirling stream gravitates to the bottom of the chamber from which it is discharged through a port 16 located in the bottom of the chamber 12 immediately adjacent to the cylindrical wall. This port is preferably so formed and located that it will neither impede the whirling action of the gaseous fluid traversing the chamber nor obstruct or impede the whirling action of the extraneous liquid collecting in the bottom of the chamber, since under most conditions, it is desirable to maintain a centrifugal head in the extraneous liquid so collected that it may be discharged from the chamber into a pressure equal to the pressure of the source of supply of the stream or fluid entering the chamber.

A feature of my invention and the apparatus embodying it is that the cylindrical surface of the chamber 12, against which liquid or moisture is thrown, is so positioned that it is relatively remote from the region of reversal of the stream flow and is so located, with relation to the outlet port 14, that there is no continuous surface between it and the outlet port 14, along which liquid or moisture can be impelled toward and through the outlet port, by the entraining action of the rapidly moving fluid stream.

When the separator is employed as a steam separator and is located within the shell 24 of a steam boiler or generator as diagrammatically illustrated in Fig. 1, I provide the port 16 with a downwardly projecting discharge pipe 16ª which extends below the water level maintained in the boiler.

With the arrangement of the port 13 and port 14 above described, it will be apparent that the stream traversing the chamber 12 is not only abruptly reversed in the direction of its lineal flow, but that the cross-sectional area of the stream is materially reduced as the fluid moves toward and through the outlet port 14. The apparatus described may be termed the initial stage of the separator and it accomplishes a partial separation of the extraneous material from the stream of gaseous fluid traversing it.

The secondary stage is so formed and located that it receives the stream of fluid which has traversed the first stage. As has been stated, its function is to extract or separate from the stream such extraneous material as has not been removed by the first stage.

As illustrated in Fig. 1, this secondary stage consists of a cylindrical member 17 and a collecting chamber 18, which is provided with a liquid discharge port 19 located at or near the bottom thereof. The cylindrical member is illustrated as an annular flange surrounding the port 14 and its inner face forms a collecting surface which confines and also directs the flow of fluid issuing from the port 14. This collecting surface is preferably machined and may be provided with separate means for wetting it. Where the separator is employed as a steam separator, the moisture collected from the steam traversing the separator will maintain the surface wet and, therefore, will increase its effectiveness as a moisture collecting surface.

The member 17 is so formed and located as to provide an annular gap 17ª of appreciable width between it and the adjacent edge of a fluid conductor or passage 20 through which the fluid is finally delivered after having traversed the separator. For convenience of manufacture and assembly, I have shown the gap 17ª as formed between the member 17 and a separately formed shoulder 21 which is of the same internal diameter as the major portion of the member 17 and as the conduit or passage 20, and which is also axially aligned with these two elements.

As shown, the shoulder 21 is formed as an integral part of an annular cap 22 which forms a closure for the chamber 18 and which also forms a support for the short section of piping which constitutes a part of the fluid delivery conduit 20.

With this arrangement of apparatus, it will be apparent that the stream of fluid issuing from the chamber 12 is received by the member 17 and is confined and directed by that member. As has been stated, a whirling action is imparted to the stream of fluid traversing the first stage or chamber 12, and the fluid is delivered to the member 17 before the whirling velocity is expended and while the stream is still under the disturbing influence of the abrupt change in the direction of flow and the abrupt reduction in sectional area. It will, therefore, be apparent that the inner peripheral surface of the member 17 will be particularly effective in collecting extraneous material, such as water and moisture, from the fluid stream, since a large portion of the fluid constituting the stream will actually contact with the surface during the incipient stages of establishing uniform and more or less stratified stream line flow; and, in addition, the residual whirling velocity of the fluid will also cause the extraneous material to move outwardly and into contact with the collecting surface.

Where the separator is employed as a steam separator the moisture collected from the stream of steam traversing the member 17 is subjected to the entraining action of the rapidly moving stream, but the character of the surface of the member 17 causes the water to spread out in a thin film over the entire collecting surface and the cohesive action between the film and the surface therefore prevents the water or moisture being dislodged from the surface and reentrained by the fluid stream. This film of water is, however, moved in a spiral direction toward the gap 17$^a$ because it is subjected to the influence of both the lineal and the whirling movement of the fluid stream traversing the member 17.

The upper end of the member 17 is so formed that the collecting surface is flared outwardly toward the gap 17$^a$ to a diameter greater than the internal diameter of the major portion of the member 17 but not to such an extent as will produce an appreciable partial expansion of the fluid constituting the stream.

With this arrangement, the liquid film moving upwardly along the surface of the member 17 also moves outwardly as it approaches the gap 17$^a$. In order to maintain the film at a substantially uniform thickness at the upper edge of the member 17, which in the embodiment illustrated constitutes one bounding edge of the gap 17$^a$, this edge is made as narrow as is practical and the outer peripheral surface of the member 17 is not only machined but is also tapered, away from the gap, to a reduced diameter at a point 17$^b$ located an appreciable distance below the gap.

With this arrangement, there is little or no tendency for the liquid film moving toward the gap to accumulate in large globules or drops, but there is a tendency for the liquid to be maintained in film-like formation as it passes over and around the upper edge of the member 17 and down the tapered portion of the outer surface of that member.

The entraining action of the fluid traversing the member 17 impels the liquid film along the collecting surface in a spiral direction; and this entraining or impelling action of the fluid, together with the force of cohesion, prevents a building up in the thickness of the fluid stream as it traverses the flared portion of the collecting surface where the entraining force progressively decreases as the film moves outwardly toward the upper edge of the member 17 and where the resitsance to flow of the film increases due to the progressively increasing diameter of the path of film flow. The tendency for the film to collect in globules or drops at the upper edge of the member 17 is offset or effectively minimized because the film on reaching that edge is travelling in a spiral direction with appreciable angular velocity and it there encounters the inwardly tapered outer face of the member 17. It is a demonstrable fact that under such conditions of flow, a liquid film will move inwardly along a surface at an angle to the axis of its rotation with greater alacrity than along a cylindrical surface parallel to its axis; possibly because the surface at an angle offers a path of decreasing resistance to flow, in that it presents a progressively decreasing path of flow around the axis of rotation.

For want of a better term to characterize the phenomenon which causes a spirally moving liquid film to move inwardly along a surface at an angle to the axis of its rotation, I will employ the term centripetal force, since the force which causes the liquid film to move inwardly is in opposition to centrifugal force and the movement of the fluid resulting from the action of this force is in opposition to the movement which would be occasioned by centrifugal force.

It will, therefore, be apparent that a member 17, such as illustrated, will prevent, or greatly minimize, the tendency of the liquid, constituting the film, to form in globules or drops at the edge of gap 17$^a$ and that, consequently, there will be little or no re-entrainment of the liquid collected from the moving stream but substantially all, if not all, of the liquid so collected will be collected in the chamber 18 where it is no longer subjected to the entraining forces and from which it may be discharged through the port 19.

I have discovered that, by tapering the outer surface of the member at the gap as illustrated, I can, not only reduce the tendency of re-entrainment at the gap but I can also in large measure prevent the formation of globules of liquid at the upper edge of the collecting surface, by so proportioning the taper of the outer surface of the member that the liquid of the film will be carried downwardly and away from the gap by the so-called " centripetal " action as fast, if not faster, than it is delivered to the edge of the gap. In the apparatus illustrated, I, therefore, not only minimize the entraining effect by flaring the surface at the gap but I also offset the tendency toward globule formation by the combined action of the cohesive force and the so-called " centripetal " force.

In Fig. 1, the two-stage separator is shown located within the shell 24 of a steam generator and associated with the steam delivery port of the generator. The separator is located within the steam space or steam drum of the generator and is preferably positioned immediately adjacent to the steam delivery port. An annular baffle 25 is mounted on the upper edge of the cylindrical wall of the chamber 12 and preferably projects outwardly to a point adjacent the shell 24. This baffle acts to deflect large globules of water carried by the steam and, therefore, to some extent shields the inlet port 13 of the first stage.

The operation of the apparatus may be briefly described as follows: Steam from the upper part of the steam drum or steam chamber enters the port 13 and passes downwardly through the vanes 15. The vanes impart a rotary or whirling velocity to the steam passing through them and deliver the steam in a whirling and downwardly moving annular stream toward the bottom of the chamber 12. The rotary or whirling velocity imparted to the stream of steam is effective in throwing the water carried by the stream outwardly and against the cylindrical wall of the chamber, so that the water collects on the wall and gravitates to the bottom of the chamber. The so-called centripetal action, to which reference has been made, however, causes a portion of the water so collected to move inwardly along the bottom of the chamber toward the vortex of the whirling stream and to be re-entrained at the vortex in the form of fine spray. The whirling stream is reversed in the direction of its lineal flow after entering the chamber 12 and while rotating at a high velocity and then passes upwardly toward the outlet port 14. This abrupt change in the direction of flow and the abrupt reduction in area of the stream occasions a disturbed condition in the stream as it enters a cylindrical member 17. This condition, as has been said, increases the effectiveness of the cohesive collecting surface provided on the member 17. The moisture and water remaining in the steam after it has traversed the first stage are separated from the upwardly moving stream as it passes through the second stage or the member 17.

It will, of course, be apparent that the collecting surface should be formed on material which has a high affinity for the film-forming liquid or, in other words, which is readily wetted by the film-forming liquid. Where the separator is employed for the purpose of separating moisture from steam, the member 17 should be formed of a material readily wet by water and, in addition, care should be taken to so form the collecting surface that a film of substantially uniform thickness will spread over the entire collecting surface. That this is essential will be apparent when it is understood that the adhesive or cohesive forces must be sufficient to offset the tendency of the rapidly moving fluid stream to re-entrain the liquid or extraneous material collected on the collecting surface.

The liquid comprising the film moving along the collecting surface moves into the confines of the chamber 18 under the influence of the forces acting on it and is finally collected in the chamber 18 discharged from that chamber through the port 19 and suitable piping 19ª. Inasmuch as the fluid pressure existing within the chamber 18 is somewhat below the pressure at the source of the fluid forming the fluid stream, some means such as a water trap should be employed in the piping 19ª for collecting and discharging the liquid whether the liquid is delivered back to the fluid source or is discharged into a region of lower pressure.

An important feature of my invention is that it can be effectively employed in connection with a steam boiler without the necessity of employing relatively large steam traps or traps of sufficient size to handle all of the water or moisture separated from the outgoing steam. This results from the fact that the first stage of the separator, which separates the major portion of the water from the outgoing steam, is not only located within the boiler but is also capable of discharging water collected by it directly into the boiler without the necessity of employing a trap. It is, therefore, only necessary to provide a trap of sufficient capacity to take care of the relatively small amount of water collected by the second stage.

An incidental advantage of apparatus embodying my invention is also obtained where the apparatus is employed with a steam boiler operating with water containing varying amounts of impurities. It will be apparent that, when the boiler water is comparatively free from dissolved or suspended matter, small "blow-downs" only are required; but where such impurities are present in large quantities, the "blow-downs" must be correspondingly increased.

Where the boiler water is comparatively free from impurities, the primary stage of the separator removes practically all of the moisture carried by the outgoing steam and very little water is discharged from the secondary stage to the outside of the boiler; but as the impurities in the boiler increase, larger quantities of water are removed from the secondary stage, due to the fact that the outgoing steam carries larger quantities of moisture, and, therefore, correspondingly greater amounts of water are discharged from the secondary stage and, consequently, from the boiler. This fact renders it unnecessary to increase the number of "blow-downs" but tends to make it possible to operate the boiler with substantially the same number and extent of "blow-downs" as are employed where the boiler water is comparatively free from impurities.

Figure 2:
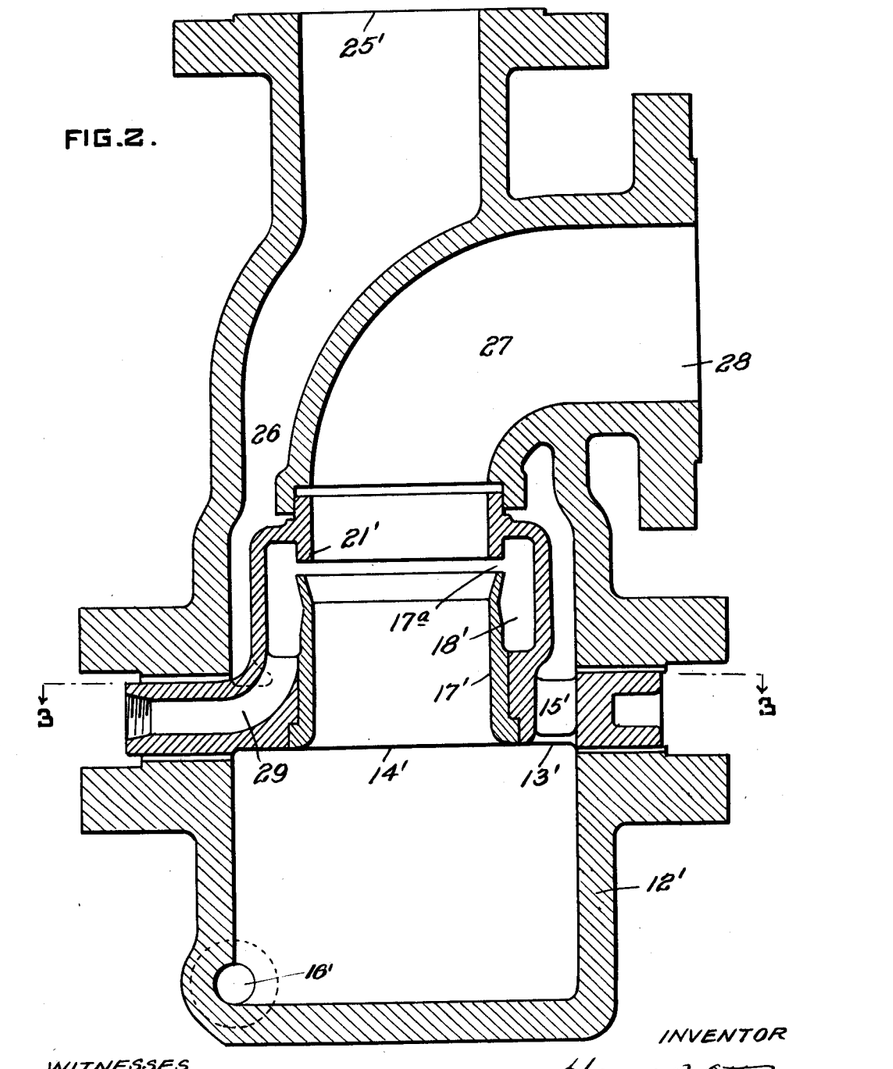
Fig. 2 is a sectional view of a modified form of the apparatus illustrated in Fig. 1.

Fig. 2 is a sectional view of a modified form of the apparatus embodying my invention and which may be employed at any point in a steam line or conduit. As there illustrated, both stages of the separator are embodied in a unitary structure which may be connected into a steam line or main composed of standard steam piping. As shown, the chamber 12' receives steam through an annular inlet port 13' which is provided with an annular series of inclined vanes 15'. The steam entering the port 13' is received through a flanged port 25' and a steam passage 26 which partially surrounds the secondary stage of the separator.

The secondary stage includes the cylindrical member 17' and the collecting chamber 18'. The member 17' is provided with a collecting surface similar to the surface described in connection with Fig. 1. A gap, 17ª, is provided between the member 17' and a shoulder 21' which forms a part of a short cylindrical section communicating with a curved fluid delivery passage 27 terminating in a flanged port 28.

The discharge port 16' of the chamber 12' is connected by piping (not shown) to any well-known form of steam trap for the purpose of delivering the water collected in the first stage to any receptacle maintained at a pressure less than that of the steam, such for example as atmospheric pressure. The secondary collecting chamber 18' communicates with a passage 29 which may be formed in the casting forming a wall of the chamber 18' and which, throughout a portion of its length, passes through the steam inlet passage to the first stage. This passage 29 is also provided with a steam trap (not shown) of usual form for the purpose of delivering the water collected in the chamber 18' and at the same time preventing a drop in pressure within the chamber.

For the purpose of disclosing what I now consider to be the correct proportioning of the parts, it may be stated that where the steam port 25 is approximately 4" in internal diameter, the internal diameter of the chamber 12' is approximately 8", the member 17', 21' and the passage 27 are approximately 4" in internal diameter and the gap 17ª is approximately 3/8" in width.

Figure 3:
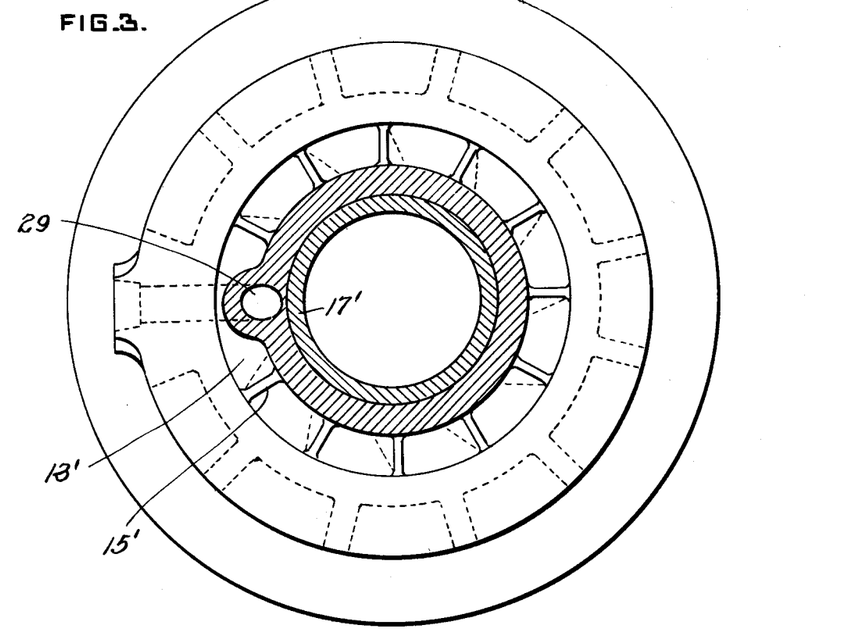
Fig. 3 is a sectional view along the line 3—3 of Fig. 2.
Figure 4:
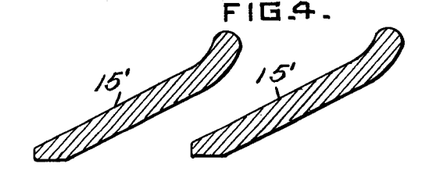
Fig. 4 is a sectional view of vanes forming a detail of my invention.

In Fig. 3, I have shown a sectional view illustrating in top plan the inlet port 13' and the blades 15'. The inclination and relative spacing of the blades 15' are illustrated in Fig. 4.

It will be apparent that the apparatus herein illustrated and the method herein described may be employed for separating extraneous material such as dust or other solid material from gaseous fluids such for example as blast furnace or producer gas, and that where such material is to be extracted from a fluid, means will be provided for introducing water or a similar liquid into the first stage of the separator with the fluid to be treated. If sufficient liquid is introduced into the first stage, it will be unnecessary to introduce additional liquid for the purpose of wetting the cylindrical collecting surface employed in connection with the second stage. However, additional liquid may be introduced into the second stage for the purpose of wetting this surface by providing an annular row of small inlet apertures around and near the bottom of the cylindrical member 17. A source of liquid supply will be placed in communication with these apertures and be maintained under sufficient head to merely maintain a liquid film of the desired thickness on the cylindrical collecting surface.

Figure 5:
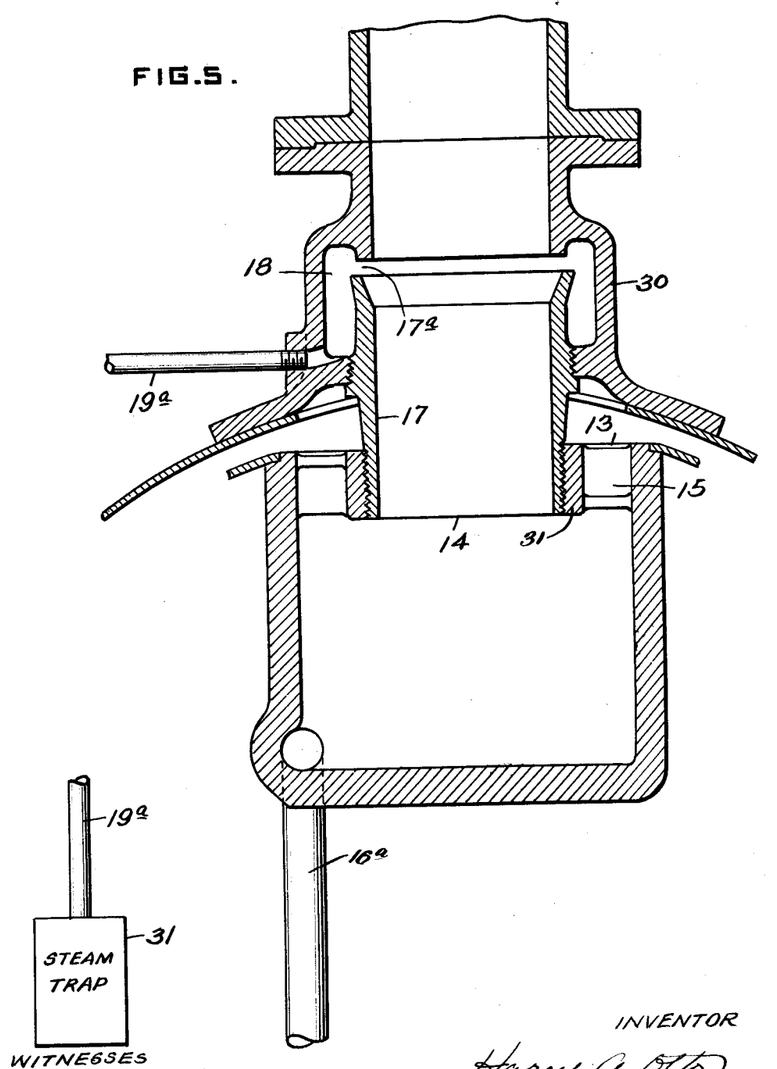
Figure 5 is a sectional view of still another modification of apparatus embodying my invention.

In Fig. 5, I have illustrated an embodiment of my invention in which the primary stage only is located within the confines of the boiler shell. As there illustrated, the secondary stage is formed as a part of the boiler nozzle and is, consequently, located outside of the boiler shell. This is advantageous since it overcomes the necessity of delivering the water collected by the secondary stage through the boiler shell to the outside of the boiler and it, therefore, simplifies the installation of the separator.

As illustrated, the walls of the chamber 18 are formed as an integral part of the boiler nozzle 30 which, as is customary, is provided with suitable flanges for securing it to the boiler shell and also to the steam main or header. The first stage, together with the directing vanes 15, is formed as a separate element and the outlet port 14 of this stage is surrounded by a cylindrical flange 31 which is internally threaded and is adapted to received the member 17 which is also threaded into a screw threaded portion of the nozzle 30 so that it provides a secondary collecting surface.

With this arrangement, the liquid collected by the first stage is drained back into the boiler through the piping 16ª as in the apparatus illustrated in Fig. 1; but the discharge piping 19ª, communicating with the collecting chamber 18 of the secondary stage, is located outside of the boiler shell and, consequently, may be directly connected, by means of suitable piping, to a trap located outside of the boiler shell. While this arrangement of apparatus has the advantages above pointed out, it also has the advantages which have previously been described in connection with the apparatus illustrated in Fig. 1.

It will also be apparent that various other changes, additions and omissions may be made in the apparatus illustrated without departing from the spirit and scope of the invention as set forth by the appended claims.

What I claim is:—

1. The method of extracting extraneous material from a stream of gaseous fluid moving at a high lineal velocity, which consists in imparting a rotary velocity to said moving stream and subjecting the stream to the cohesive action of a collecting surface and thereby collecting extraneous material from said stream in a continuously forming thin liquid film on said surface, continuously moving said film along said surface in the direction of flow of said stream by means of the entraining effect of said moving stream, and continuously removing the film from the collecting surface by the combined action of cohesive and "centripetal" force.

2. The method of extracting extraneous material from a stream of gaseous fluid moving at a high lineal velocity, which consists in imparting rotary velocity to said moving stream, removing extraneous material thrown outwardly from said stream by the rotary velocity thereof, then subjecting the stream while rotating to the cohesive action of a collecting surface and collecting extraneous material therefrom on said surface in the form of a continuously forming thin liquid film, continuously impelling said film along said surface in the direction of flow of said stream by means of the entraining effect of said stream, continuously moving said film so impelled away from the zone of entrainment effect of said stream and removing said film from said surface by "centripetal" force.

3. A method of extracting extraneous material from a stream of gaseous fluid moving at a high velocity, which consists in imparting rotary velocity to said moving stream, removing extraneous material thrown outwardly from said stream by reason of said rotary velocity, then subjecting the stream while whirling to the cohesive action of a collecting surface and collecting extraneous material therefrom on said surface in the form of a continuously forming thin liquid film, continuously impelling said film in a spiral direction along the surface by the entraining action of said stream, and continuously collecting the liquid comprising said film and discharging it under the influence of a force other than the entraining action of said stream.

4. A method of extracting extraneous material from a stream of gaseous fluid moving at a high lineal velocity, which consists in imparting a rotary velocity to said moving stream, removing extraneous material thrown outwardly from said stream by reason of its rotary velocity, abruptly changing the direction of lineal flow of said stream while it is rotating, then subjecting the stream to the cohesive action of a collecting surface, and thereby collecting extraneous material therefrom and on said surface in a continuously forming thin liquid film, continuously impelling said film along said surface in the direction of flow of said stream by the entraining effect of said stream, and continuously removing and discharging the liquid comprising said film, by the combined action of cohesive and "centripetal" force.

5. A method of extracting moisture from steam, which consists in imparting a high rotary velocity to a stream of steam moving at a high lineal velocity, removing the water thrown outwardly from said stream by reason of the rotary velocity, then subjecting the stream while whirling to the cohesive action of a collecting surface, and collecting moisture from said stream on said surface in the form of a continuously forming thin film, continuously impelling said film spirally along said surface in the direction of flow of the steam by the entraining effect of said stream, and continuously moving said film so impelled away from the zone of entraining effect of the stream and by the "centripetal" force occasioned by the rotative velocity imparted to the film by the rotary velocity of said stream, and continuously collecting and discharging the water forming said film.

6. The method of extracting extraneous material from a stream of gaseous fluid, which consists in imparting a rotary velocity to the stream of fluid while it is moving at a high lineal velocity, introducing a collecting liquid into said whirling stream, removing liquid and extraneous material collected thereby which is thrown outwardly by reason of the whirling movement of said stream, subjecting the stream while whirling to the cohesive action of a collecting surface and collecting liquid therefrom on said surface in a continuously forming liquid film, continuously impelling said film along said surface in the direction of flow of said stream by the entraining action of said stream, and continuously collecting the liquid and extraneous material forming said film, and discharging it at a point remote from the discharge of said stream and under the influence of a force other than the entraining action of said stream.

7. An apparatus of the character described, comprising means for occasioning a whirling velocity in a rapidly moving stream of fluid, means for abruptly changing the direction of flow of said fluid and for withdrawing from said stream extraneous material thrown outwardly by said whirling velocity, a cylindrical member having a collecting surface formed thereon confining said stream after said change in direction thereof and terminating at an annular gap and having an outer surface contiguous with said gap tapering to a smaller diameter away from said gap, and a collecting chamber surrounding said tapered portion of said member and communicating with said gap and provided with an extraneous material discharge port.

8. In combination, in a separator for gaseous fluid, a chamber having a fluid inlet port, a fluid outlet port and a liquid discharge port, means associated with said inlet port for imparting a rotary velocity to fluid traversing said chamber, a cylindrical member surrounding said fluid outlet port and provided with an inner cylindrical collecting surface for receiving fluid issuing from said outlet port and so formed as to provide a gap across which fluid passes after having traversed said collecting surface, said surface being slightly flared outwardly in the direction of fluid flow at the gap end thereof and said member being provided with an external surface, contiguous to said flared portion of said collecting surface, which is tapered inwardly and away from said gap to a reduced diameter, and a chamber surrounding said tapered surface communicating with said gap and provided with a discharge port.

9. In combination, in an apparatus of the character described, a cylindrical member for confining and directing a fluid stream moving toward a fluid distributing passage and providing a gap across which the fluid stream moves, the outer peripheral face of said member contiguous to said gap, being tapered away from said gap to a reduced diameter, and a chamber surrounding said gap and provided with a liquid discharge port in the bottom thereof.

10. In an apparatus of the character described, means for imparting a whirling velocity to a fluid stream moving at a high velocity, a cylindrical member for confining the whirling stream and directing it toward a fluid distributing passage and providing a gap across which the stream moves in issuing from said member, the inner collecting face of said member being flared in the direction of fluid flow immediately adjacent said gap and the outer peripheral face of said member, contiguous to said flared portion, being tapered to a reduced diameter away from said gap, and a chamber surrounding said gap and communicating therewith and provided with a liquid discharge port in the bottom thereof.

11. In combination with a steam boiler, a steam separator comprising a primary stage located within the boiler and provided with a discharge port communicating with the interior of the boiler, and a secondary stage directly communicating with said primary stage, and located outside the shell of the boiler and provided with a discharge port located outside the boiler.

12. In combination with a steam boiler, a two-stage separator through which steam issuing from the boiler passes, means for delivering moisture collected in the first stage directly to the interior of the boiler, and a trap for delivering the liquid issuing from the second stage to a region of lower pressure.

13. A process of extracting extraneous material from a moving stream of gaseous fluid which consists in delivering said stream to a separating zone and imparting thereto a whirling velocity, confining the whirling stream entering the zone by means of a collecting surface, reversing the lineal direction of flow of said stream within said zone while augmenting the whirling velocity of the stream by the angular urge of the incoming stream, causing said stream to move at an abrupt angle away from the surface by which its direction of lineal flow is reversed, and isolating said stream from collecting surfaces within said zone by means of the incoming stream before reversal thereof.

14. A process of extracting extraneous material from a moving stream of gaseous fluid, which consists in projecting fluid in an annular stream at a high lineal velocity along the axis of the annulus and at a high rotary velocity around said axis, while confining the outer periphery of the stream, reversing the lineal direction of flow without materially reducing the rotary velocity of the stream and consolidating the reversed stream and causing it to flow through said annulus while augmenting the whirling velocity thereof by subjecting the consolidating stream to the whirling urge of the incoming stream.

15. A process of extracting extraneous material from a moving stream of gaseous fluid, which consists in projecting fluid in an annular stream at a high lineal velocity along the axis of the annulus and at a high rotary velocity around said axis, while confining the outer periphery of the stream, changing the lineal direction of flow without materially reducing the rotary velocity of the stream, consolidating the stream and causing it to flow through said annulus while augmenting the whirling velocity thereof by subjecting the consolidated stream to the whirling urge of the annular stream.

16. The method of extracting extraneous material from a stream of gaseous fluid moving at a high velocity which consists in imparting rotary velocity to said moving stream, removing extraneous material thrown outwardly therefrom by reason of said rotary velocity, subjecting the stream while whirling to the cohesive action of a collecting surface, collecting extraneous material from said stream on said surface in the form of a continuously forming thin film, continuously impelling said film in the direction of travel of the stream along said surface, continuously collecting said film and discharging it at a point remote from the point of discharge of said stream and independently of the discharge of said stream and under the influence of forces other than the entraining action of said stream.

17. A process of extracting extraneous material from a stream of gaseous fluid, which consists in imparting whirling as well as lineal velocity to the stream of fluid, changing the lineal direction of flow of said fluid while augmenting the whirling velocity thereof by subjecting the fluid after the change in direction to the whirling force of the fluid prior to the change in direction of lineal flow then in subjecting the fluid to the action of a collecting surface and in discharging material collected on said surface under the action of forces other than the entraining force of the fluid stream.

18. A process of extracting extraneous material from gaseous fluid, which consists in projecting the fluid in the form of an annular stream whirling at a high velocity, consolidating the annular stream into a whirling stream moving substantially along the axis of rotation of the annular portion thereof, augmenting the whirling motion of the consolidated stream by subjecting it to the whirling action of the annular portion thereof, causing the consolidated portion of the stream to move past a cylindrical collecting surface while whirling at a high velocity and collecting extraneous material on said surface in the form of a continuously forming thin film, continuously impelling said film along said surface by the entraining effect of said stream and discharging such material at a point remote from the discharge of said fluid and under the influence of forces other than the entraining action of said stream.

19. A process of extracting moisture from steam, which consists in projecting steam in a whirling annular stream, consolidating the annular stream into a whirling stream moving substantially axially of the annular portion thereof and while subjecting the consolidating stream to the whirling force of the annular portion thereof, then subjecting the consolidated stream, while whirling, to the cohesive action of a collecting surface and collecting moisture therefrom on said surface in the form of a continuously forming thin film, continuously impelling said film along said surface by the entraining effect of the stream and continuously removing said film away from the zone of entrainment effect of said stream.

20. A process of extracting extraneous material from gaseous fluid, which consists in projecting the fluid in the form of a whirling stream, causing the stream to move substantially along the axis of its whirling motion while augmenting the whirling force of such portion of the stream by subjecting it to the whirling force of the oncoming portion of the stream, in collecting extraneous material from said axially moving portion of the stream, and in discharging such material collected under the influence of forces other than the entraining force of said stream.

21. A process of extracting moisture from steam which consists in projecting the steam in the form of a whirling stream, causing the stream so formed to move substantially along the axis of its whirling motion, while augmenting the whirling force of such portion of the stream by subjecting it to the whirling force of the oncoming portion of the stream, subjecting such axially moving portion of the stream to the cohesive action of a collecting surface, collecting moisture therefrom on said surface in the form of a thin film of liquid, continuously moving the film along said surface by the entraining effect of said stream and discharging said film under the action of forces other than the entraining force of said film.

22. A process of removing moisture from steam which consists in projecting the steam in the form of a whirling stream, removing moisture discharged therefrom, causing said stream to move substantially along the axis of its rotary motion while augmenting the rotary motion of such portion of said stream by subjecting it to the whirling force of the oncoming portion thereof, subjecting such axially moving portion of the stream to the action of a collecting surface, collecting moisture therefrom on said surface in the form of a continuously forming thin film of liquid, continuously moving the film along said surface by the entraining effect of said stream, and discharging the liquid of the film under the influence of forces other than the entraining force of said stream.

23. A separator for fluids such as steam comprising a chamber having an unobstructed passage for fluid therethrough and having a fluid inlet and a fluid outlet, an annular series of vanes associated with said inlet for imparting whirling velocity to the fluid entering said chamber, means located above said vanes and associated with said outlet for collecting extraneous material from said fluid, and means for discharging the material so collected.

24. A separator for fluids such as steam, comprising a chamber having a clear passage for fluid therethrough and having a fluid inlet and fluid outlet so located with relation to each other that the fluid is caused to change its lineal direction of flow in passing through said chamber, directing vanes associated with said inlet for imparting whirling velocity to the fluid traversing said chamber, means associated with said outlet and located above said inlet for collecting extraneous material from the fluid after the change in lineal direction thereof and means for discharging the material so collected.

25. An apparatus for removing extraneous material from a gaseous fluid, a chamber having an unobstructed passage therethrough for fluid and having a fluid inlet, a fluid outlet, and a liquid discharge port, said fluid inlet and outlet being located above said discharge port and in such relation that fluid is caused to change its lineal direction of flow in traversing said chamber, directing vanes associated with said inlet port for imparting whirling velocity to the fluid traversing the chamber, means located above said fluid inlet for collecting extraneous material from said fluid after the change in direction of flow thereof, and means for discharging the material so collected.

26. A steam separator provided with a separating chamber provided with means for imparting a whirling velocity to steam traversing said chamber, means for reversing the direction of flow of the steam through said chamber, and an associated outlet through which the collected water is discharged at a pressure greater than the fluid pressure traversing said chamber.

27. A two-stage separator for steam provided with a chamber for collecting water extracted in the first stage thereof, an outlet, means for reversing the direction of flow of the steam through said chamber for discharging the collected water at a pressure greater than the pressure of the steam traversing said chamber, and means for discharging the water extracted in the second stage of said separator into a pressure less than the pressure of the fluid traversing said second stage.

28. The process of extracting water from steam which consists in providing an annularly-whirling axially-moving stream, extracting water from said stream by centrifugal force, reversing the direction of flow and consolidating said stream, and extracting water from said reversed and consolidated stream by centrifugal force.

29. A separator for fluids such as steam comprising a chamber having an unobstructed passage for fluid therethrough and having a fluid inlet and a fluid outlet, an annular series of vanes associated with said inlet for imparting whirling velocity to the fluid entering said chamber, means arranged above said vanes and associated with said outlet for collecting extraneous material from said fluid, and means for discharging the material so collected into a separate chamber.

In testimony whereof, I have hereunto subscribed my name this 3rd day of November, 1924.

HARRY A. OTTO.